(12) United States Patent  
Wenner et al.

(10) Patent No.: US 7,457,828 B2  
(45) Date of Patent: Nov. 25, 2008

(54) SYSTEM AND METHOD FOR SYNCHRONIZING DISTRIBUTED BUFFERS WHEN COMMITTING DATA TO A DATABASE

(75) Inventors: Tobias Wenner, Nussloch (DE); Ralf Kuersch, Sandhausen (DE); Andrea Neufeld, Limburgerhof (DE); Christian Fecht, Walldorf (DE); Dietmar Theobald, Karlsruhe (DE)

(73) Assignee: SAP AG, Walldorf (DE)

( * ) Notice: Subject to any disclaimer, the term of this patent is extended or adjusted under 35 U.S.C. 154(b) by 482 days.

(21) Appl. No.: 10/652,698

(22) Filed: Aug. 29, 2003

(65) Prior Publication Data

US 2005/0050106 A1    Mar. 3, 2005

(51) Int. Cl.  
*G06F 17/30* (2006.01)

(52) U.S. Cl. .............................. 707/201; 707/2; 707/10; 707/200

(58) Field of Classification Search ................... 707/10, 707/200; 709/201, 220, 217  
See application file for complete search history.

(56) References Cited

U.S. PATENT DOCUMENTS

| | | | |
|---|---|---|---|
| 5,745,904 A * | 4/1998 | King et al. | 707/200 |
| 6,457,007 B1 * | 9/2002 | Kikuchi et al. | 707/10 |
| 6,584,548 B1 * | 6/2003 | Bourne et al. | 711/134 |
| 6,654,769 B2 * | 11/2003 | Ito et al. | 707/200 |
| 2001/0056461 A1 * | 12/2001 | Kampe et al. | 709/201 |
| 2002/0016792 A1 * | 2/2002 | Ito et al. | 707/200 |
| 2002/0087504 A1 * | 7/2002 | Thompson | 707/1 |
| 2003/0172135 A1 * | 9/2003 | Bobick et al. | 709/220 |
| 2003/0191812 A1 * | 10/2003 | Agarwalla et al. | 709/217 |

* cited by examiner

*Primary Examiner*—Khanh B Pham  
(74) *Attorney, Agent, or Firm*—Blakely, Sokoloff, Taylor & Zafman

(57) ABSTRACT

A system and method for synchronizing distributed table buffers is disclosed. A node may contain a synch manager and a table buffer having a synch identifier. The synch manager may use the synch identifier to coordinate updates to the table buffer. The updates to the table buffer may be performed in an asynchronous and/or a synchronous manner.

33 Claims, 10 Drawing Sheets

| Timestamp | Node Identifier | Description |
|---|---|---|
| | ... | |

SYSTEM AND METHOD FOR SYNCHRONIZING DISTRIBUTED BUFFERS WHEN COMMITTING DATA TO A DATABASE

TECHNICAL FIELD

Embodiments of the invention generally relate to the field of client/server systems and, more particularly, to a system and method for synchronizing distributed buffers when committing data to a database.

BACKGROUND

Conventional client/server systems may include a client, an application server, and a database system. The client may submit a database access statement to the application server. The application server may receive the database access statement and establish a connection to the database system to retrieve the requested data. Typically, the application server is connected to the database system over a network (e.g., a Local Area Network (LAN)). Generally, only a limited number of connections are possible between the application server and the database system. Also, the network connecting the application server to the database system may perform poorly if a large number of data access statements are communicated over the network.

Conventional application servers may include a table buffer. The purpose of the table buffer is to speed up data source queries by caching frequently requested data of the database system in a buffer. Table buffers should not be confused with a Database Management System (DBMS) cache. A DBMS cache resides in the central memory area of a database system and is managed exclusively by the database system. In contrast, a table buffer resides on a computing device connected to the DBMS by a network connection. Unlike a DBMS cache, a table buffer can reduce network traffic by responding to database access statements without accessing a DBMS over a network connection, Some client/server systems may include more than one application server. Each of these application servers may include a table buffer to cache data from the same data source. If the table buffer on one application server is updated, it is desirable to update the other table buffers residing on remote application servers so that each application server is buffering valid data.

SUMMARY OF THE INVENTION

A system and method for synchronizing distributed buffers when committing data to a database is described. A node may contain a synch manager and a table buffer having a synch identifier, in an embodiment of the invention. The synch manager may use the synch identifier to coordinate updates to the table buffer. The updates to the table buffer may be performed in an asynchronous and/or a synchronous manner.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 4 illustrates synch log 400, implemented according to an embodiment of the invention.

DETAILED DESCRIPTION

Embodiments of the invention are generally directed to a system and method for synchronizing distributed table buffers when committing data to a database. Synchronizing table buffers broadly refers to ensuring that each distributed table buffer is caching valid data. As will be further explained below, however, synchronizing the table buffers may be performed in an asynchronous manner and/or a synchronous manner.

Figure 1:
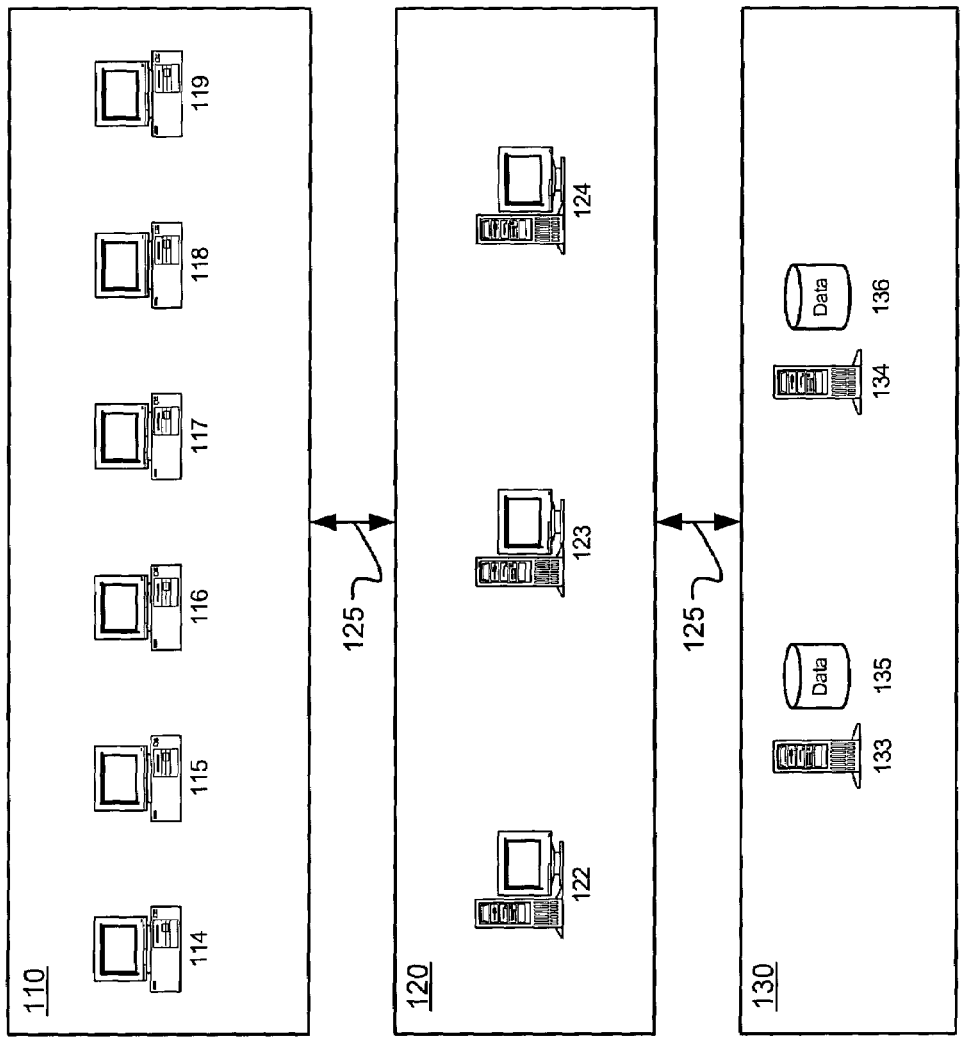
FIG. 1 is a block diagram of distributed system 100.

FIG. 1 is a block diagram of distributed system 100. The illustrated embodiment of distributed system 100 includes: user layer 110, application layer 120, and database layer 130. Some or all of the elements within each layer of distributed system 100 may be interconnected via a network (e.g., a Local Area Network (LAN)). Alternative embodiments of distributed system 100 may include more or fewer layers.

User layer 110 is the interface between distributed system 100 and one or more users. The illustrated embodiment of user layer 110 includes user terminals 114-119. One or more of user terminals 114-119 may collect user input and send it to application layer 120 over network connection 125. Network connection 125 may be a wired or wireless connection to a Local Area Network (LAN), a Wide Area Network (WAN), a Metropolitan Area Network (MAN), and/or the Internet. User terminals 114-119 may be personal computers, notebook computers, personal digital assistants, telephones, and the like. In an embodiment in which network connection 125 connects to the Internet, one or more of user terminals 114-119 may have a Web browser to interface with the Internet.

Application layer 120 includes application servers 122-124. An application server broadly refers to a computing device that performs data processing. In an embodiment, application layer 120 includes a computing device (e.g., called a dispatcher) to perform load balancing among application servers 122-124. In an embodiment in which application layer 120 exchanges information with user layer 110 via the Internet, one or more of application servers 122-124 may be described as a Web application server. Application servers 122-124 may be implemented according to the Java 2 Enterprise Edition Specification v1.4, published on Jul. 12, 2002 (the J2EE Standard), in an embodiment of the invention.

Database layer 130 provides a persistent data store for distributed system 100. The illustrated embodiment of database layer 130 includes database management systems (DBMSs) 133 and 134 as well as data sources 135 and 136. Data sources 135 and 136 may be databases or other systems capable of providing a persistent data store.

Figure 2:
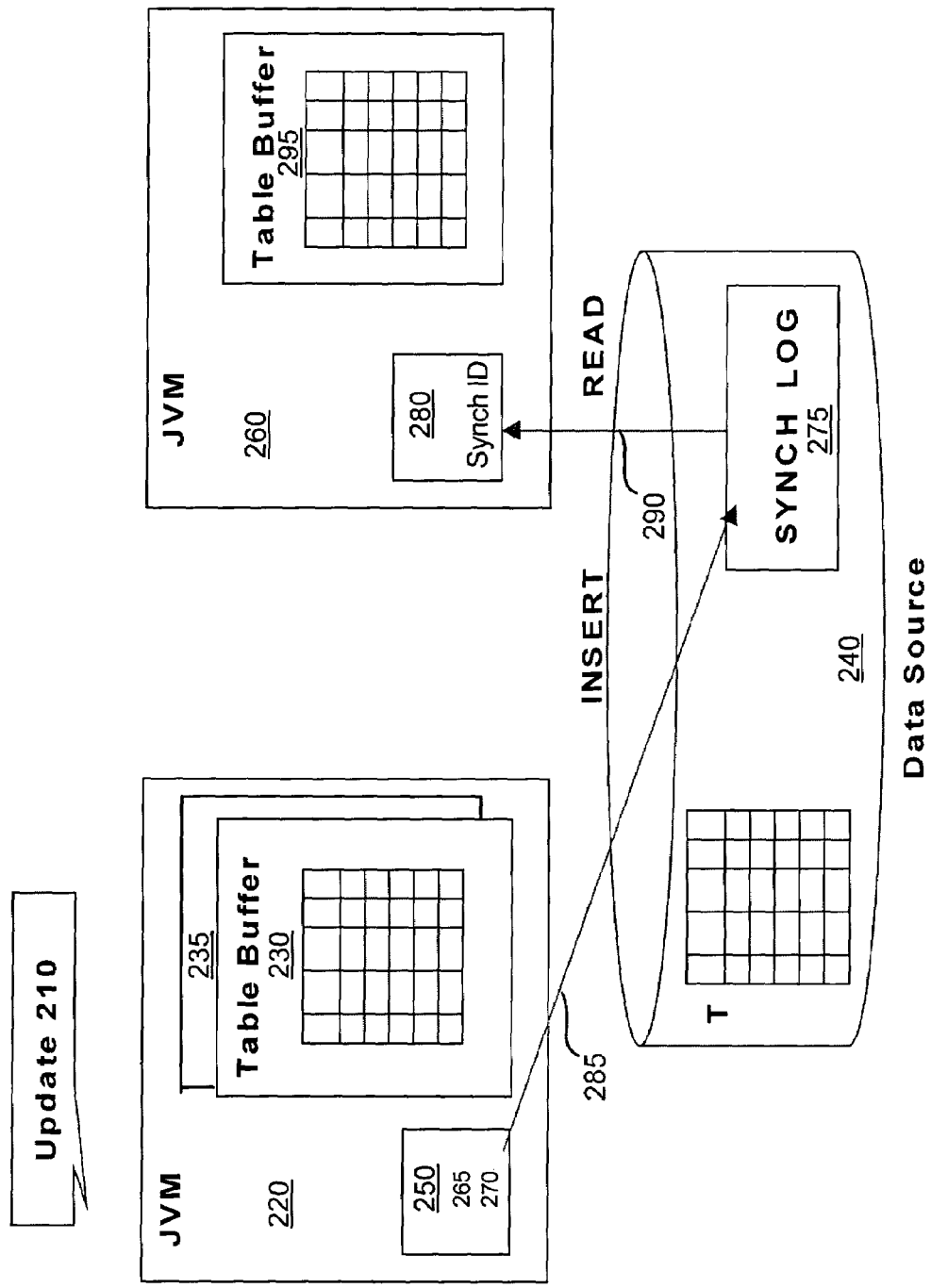
FIG. 2 is a block diagram of selected elements of distributed system 200 implemented to provide synchronization of distributed buffers, according to a embodiment of the invention.

FIG. 2 is a block diagram of selected elements of distributed system 200 implemented to provide synchronization of distributed buffers, according to an embodiment of the invention. Node 220 includes table buffers 230 and 235. In an embodiment, node 220 resides in the application layer of distributed system 200. A user (not shown) may request data processing services from node 220. Node 220, in turn, may access data source 240, while providing data processing services to a user (not shown). In an alternative embodiment of the invention, reference numeral 235 refers to a catalog buffer. A catalog buffer broadly refers to a buffer that caches information about the structure of a data source. Table buffer 230 caches at least a portion of data source 240. In an embodiment, node 220 is a Web application server that complies with the J2EE Standard. In such an embodiment, table buffer 230 may reside within a Java Virtual Machine (JVM) executing on node 220.

The illustrated embodiment of node 220 includes synch manager 250. Synch manager 250 administers updates to table buffers 230 and 235 and also provides update messages (or insert statements) to data source 240 and/or node 260, in an embodiment of the invention. In an embodiment, synch manager 250 passes each update on table buffers 230 and 235 to data source 240. Also, synch manager 250 receives update messages from data source 240 and/or node 260 (or reads synch log 275). Synch manager 250 may update table buffers 230 and 235 based on received update messages (or based on reading synch log 275). The processes executed by synch manager 250 are more fully described below with reference to FIGS. 5-11.

Synch manager 250 includes synch identifiers 265 and 270. Synch identifiers 265 and 270 may include a buffer identifier and/or a data source identifier. A buffer identifier may specify which buffer has provided the synch identifier. A data source identifier may specify which data source is cached by the buffer. In an embodiment, synch identifiers 265 and 270 may include a JVM identifier to identify a JVM machine running on node 220.

In an embodiment, table buffers are dynamically created, for example, when a physical connection is created between node 220 and a data source (e.g., data source 240). A synch identifier may be dynamically created when a buffer is created. A synch identifier may also be dynamically created when a previously created buffer is started, re-started, initialized, re-booted, etc.

In an embodiment, table buffers 230 and 235 register with synch manager 250 on start-up. Starting a table buffer broadly refers to creating, powering-on, initializing, re-booting, and/or re-starting a table buffer. Table buffers 230 and 235 register with synch manager 250, for example, to enable synch manager 250 to administer updates to table buffers 230 and 235. In an embodiment, registering with synch manager 250 includes providing a dynamically created synch identifier to synch manager 250.

Data source 240 includes synch log 275, in an embodiment of the invention. Synch log 275 is a global log of table buffer updates. In an embodiment, synch managers 250 and 280 inform synch log 275 of each update to the one or more table buffers that have registered with synch managers 250 and 280. Synch log 275 provides a list of table buffer updates that is periodically polled by synch managers 250 and 280, in an embodiment of the invention. In an alternative embodiment, synch log 275 automatically provides update information to synch managers 250 and 280.

A user (not shown) provides update 210 to node 220. Update 210 may be any update to persistently stored data. In the illustrated example, update 210 alters data that is cached in table buffer 230. Synch manager 250 determines that at least a portion of table buffer 230 has been updated. Synch manager 250 informs synch log 275 that table buffer 230 has been updated with insert statement 285. In an embodiment, insert statement 285 a Java Database Connectivity (JDBC) insert statement. The term JDBC insert statement broadly refers to an Application Program Interface (API) that is bundled with the Java 2 Platform, Standard Edition (J2SE), version 1.4.2, published June 2003. In an alternative embodiment, insert statement 285 is a Structured Query Language (SQL) statement. An SQL statement broadly refers to a statement that complies with, for example, the International Committee for Information Technology/ International Organization for Standards/ International Electrotechnical Commission (INCITS/ISO/IEC) 9075-1-1999 standard entitled, "Information Technology—Database Language— SQL Part 1: Framework (SQL/Framework)," published in 1999, (hereinafter the INCITS/ISO/IEC 9075-1-1999 Standard). The term SQL statement, however, is not limited to those SQL statements that comply with the INCITS/ISO/IEC 9075-1-1999 Standard. Rather, the term SQL statement broadly refers to an SQL statement that complies with any public and/or proprietary standard that defines an SQL database call. Insert statement 285 may also be used to update persistently stored data in data source 240.

Synch manager 280 reads data source 240 at reference numeral 290. For example, synch manager 280 may issue the following JDBC statement every n seconds to read data source 240: "SELECT FROM SYNCLOG WHERE TIMESTAMP> :last_timestamp ORDER BY TIMESTAMP. In an alternative embodiments of the invention, synch manager 280 may access data source 240 using a different statement.

Synch manager 280 determines whether table buffer 295 should be updated, in an embodiment of the invention. Determining whether table buffer 295 should be updated is more fully described below with reference to FIGS. 5-11. In an embodiment, synch manager 280 does not update the data cached within table buffer 295 until a user requests the updated data. In an alternative embodiment of the invention, synch manager 280 reads data source 240 to automatically obtain the updated data.

Figure 3:
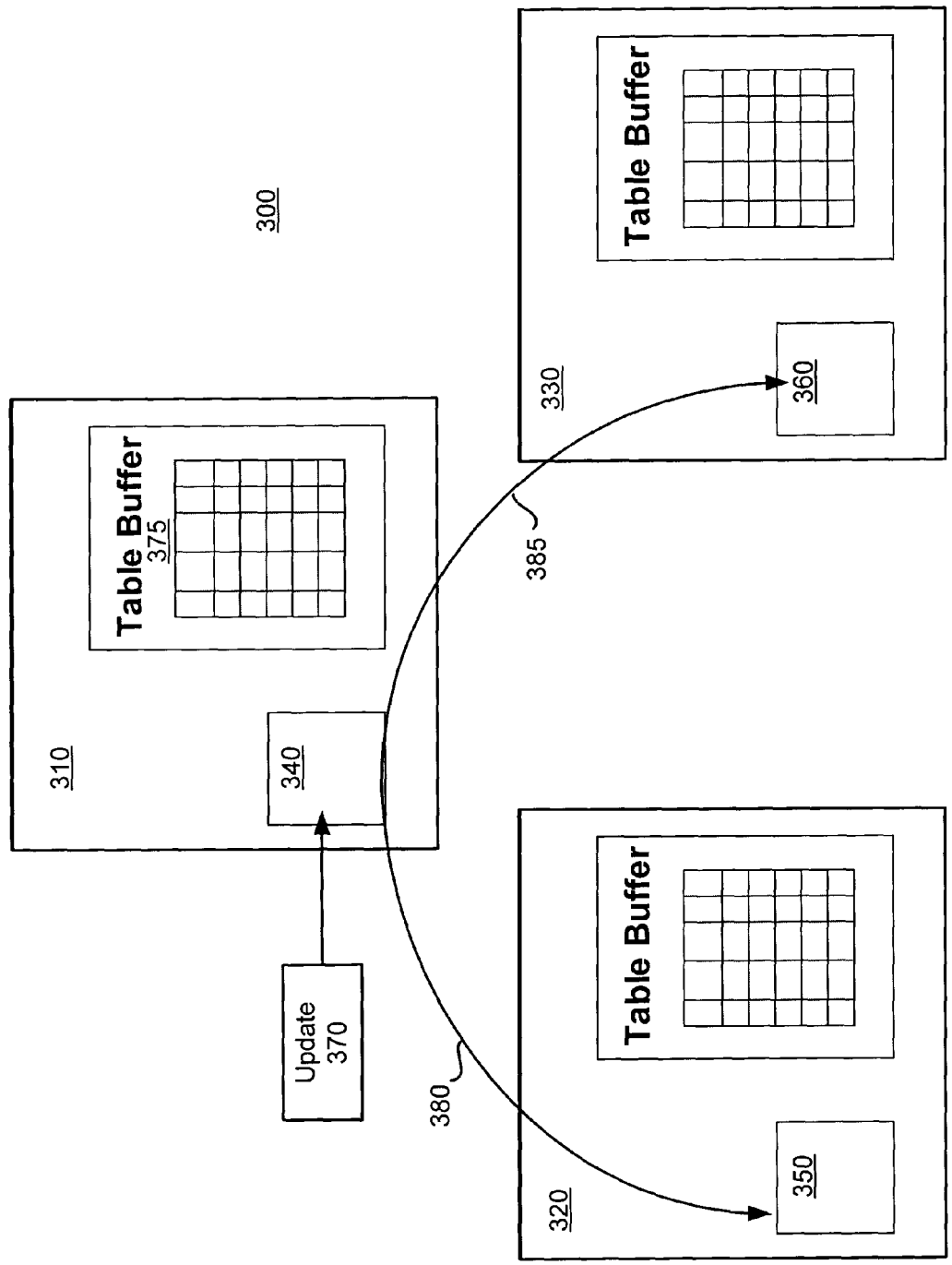
FIG. 3 is a block diagram of distributed system 300 implemented to synchronously update distributed buffers, according to an embodiment of the invention.

FIG. 3 is a block diagram of distributed system 300 implemented to synchronously update distributed buffers, according to an embodiment of the invention. Distributed system 300 includes nodes 310, 320, and 330. Nodes 310, 320, and 330 respectively include synch managers 340, 350, and 360.

A user provides update 370 which is received by synch manager 340. Synch manager 340 updates table buffer 375 responsive to update 370. Synch manager 340 also sends update messages 380 and 385 to synch managers 350 and 360, respectively. In an embodiment, update messages 380 and 385 comply with the Java Message Service Specification—Version 1.1 JMS Standard, published on Feb. 11, 2002 (hereinafter, the JMS Standard). Synch managers 350 and 360 determine whether one or more table buffers should be updated based on update messages 380 and 385, in an embodiment of the invention. The processes associated with updating table buffers are more fully described below with reference to FIGS. 5-11.

FIG. 4 illustrates synch log 400, implemented according to an embodiment of the invention. Synch log 400 includes buffer update entries 410 and 420. Buffer update entries 410 and 420 represent updates that have been executed on one or more distributed buffers. In an alternative embodiment, buffer update entries 410 and 420 represent updates to data stored on data source 240, shown in FIG. 2. The illustrated embodiment of synch log 400 includes three fields for update entries: timestamp field 430, node identifier field 440, and update description field 450. In alternative embodiments of the invention, more, fewer, and/or different fields may be used in synch log 400.

Timestamp field 430 may store a timestamp corresponding to, for example, a time when an update, or a notification of an update, reached synch log 400 (or a time when a data source associated with synch log 400 was updated by the update). Node identifier field 440 may store an identifier that specifies which node provided the update. In an embodiment of the invention, node identifier field 440 stores a Java Virtual Machine (JVM) identifier that identifies a JVM running on the node that provided the update. A node identifier may include a wide variety of identifiers including, for example, an alpha-numeric string of characters that distinguishes one node from another node. A person of ordinary skill in the art appreciates that generating identifiers is well-known in the art.

Update description field 450 provides specific information about an update that has been executed on a table buffer, in an embodiment of the invention. For example, update description field 450 may include: table name(s) and/or key values of rows in a table buffer that have been updated. If an entire table is being buffered, update description field 450 may only contain the name of the buffered table. The information stored in description field 450 may be based, at least in part, on a policy, such as a validation policy or an invalidation policy for a distributed system.

Figure 5:
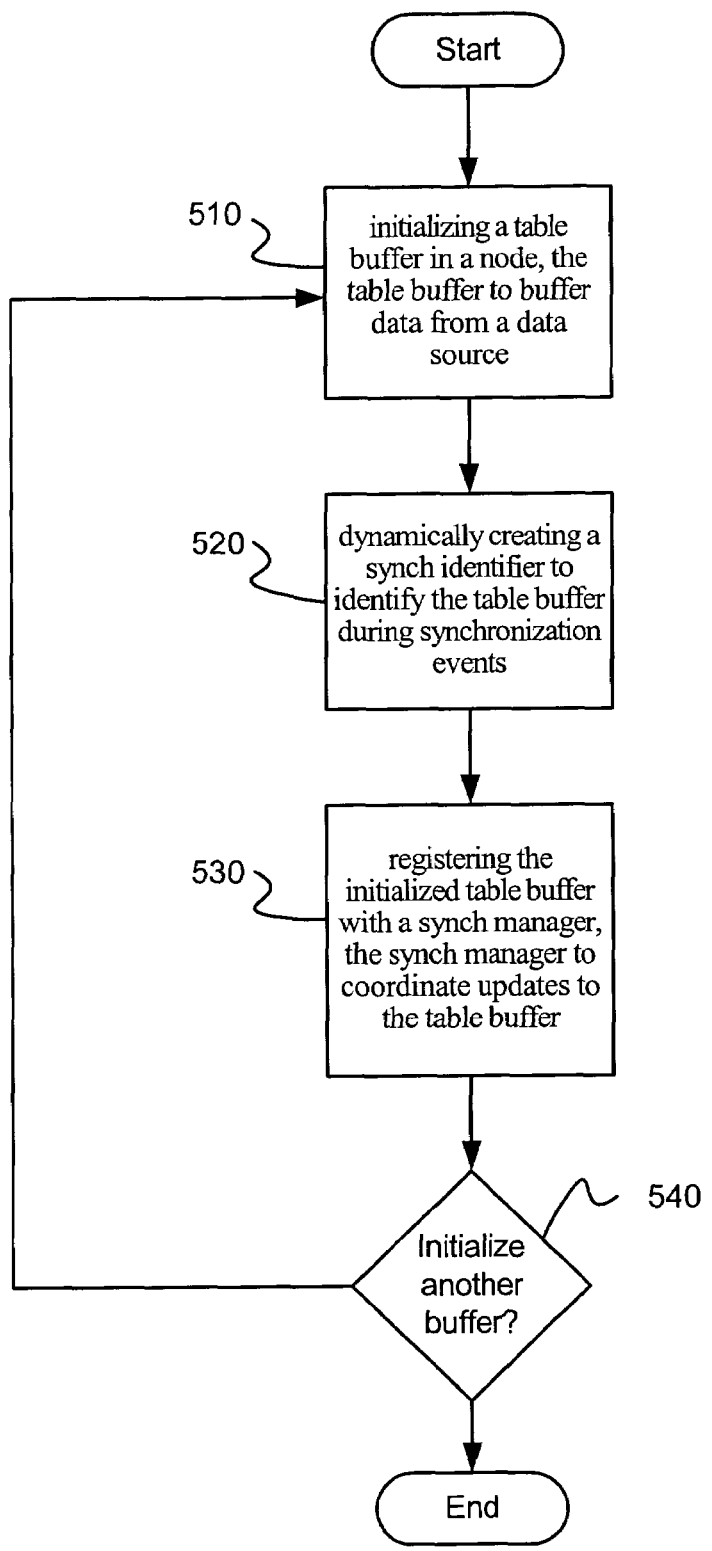
FIG. 5 is a flow diagram illustrating certain aspects of a method for initiating table buffers according to an embodiment of the invention.

Turning now to FIGS. 5-11, the particular methods associated with embodiments of the invention are described in terms of computer software and hardware with reference to a flowchart. FIG. 5 is a flow diagram illustrating certain aspects of a method for initializing table buffers according to an embodiment of the invention. Referring to process block 510 a table buffer is initialized to buffer data from a data source. Initializing a table buffer broadly refers, for example, to creating, starting, and/or re-starting a table buffer. In an embodiment, an instance of a table buffer is created for each physical connection to a data source that is established by, for example, an SQL statement.

Referring to process block 520, a synch identifier is dynamically created to identify the table buffer. As discussed above, distributed systems (e.g., distributed system 100 shown in FIG. 1) may include a number of table buffers distributed across two or more nodes (e.g., within application servers 122-124). The distributed table buffers cache selected portions of underlying data sources (e.g., data sources 135 and 136 shown in FIG. 1). A user may update data that is cached in one or more of the distributed table buffers. In order to ensure that each distributed table buffer is caching valid data, it is desirable to notify each table buffer that an update occurred. The process of ensuring that each distributed table buffer is caching valid data may be referred to as synchronizing the table buffers. As will be further explained below, however, synchronizing the table buffers may be performed in an asynchronous manner and/or a synchronous manner.

The synch identifier may be used to identify a particular table buffer and/or the data source buffered by the table buffer. Dynamically creating the synch identifier refers to automatically creating the synch identifier in response to a specified event. In an embodiment, the synch identifier is dynamically created when a corresponding table buffer is initialized.

Referring to process block 530 the table buffer is registered with a synch manager. In an embodiment, the synch manager administers data updates between one or more table buffers residing on a node, one or more data sources, and/or one or more table buffers residing on another node (or a plurality of other nodes). In an embodiment, each table buffer registers with the synch manager on start-up to enable the synch manager to administer the newly started table buffer. Registering the table buffer with the synch manger includes providing the dynamically created synch identifier to the synch manager, in an embodiment of the invention.

Figure 6:
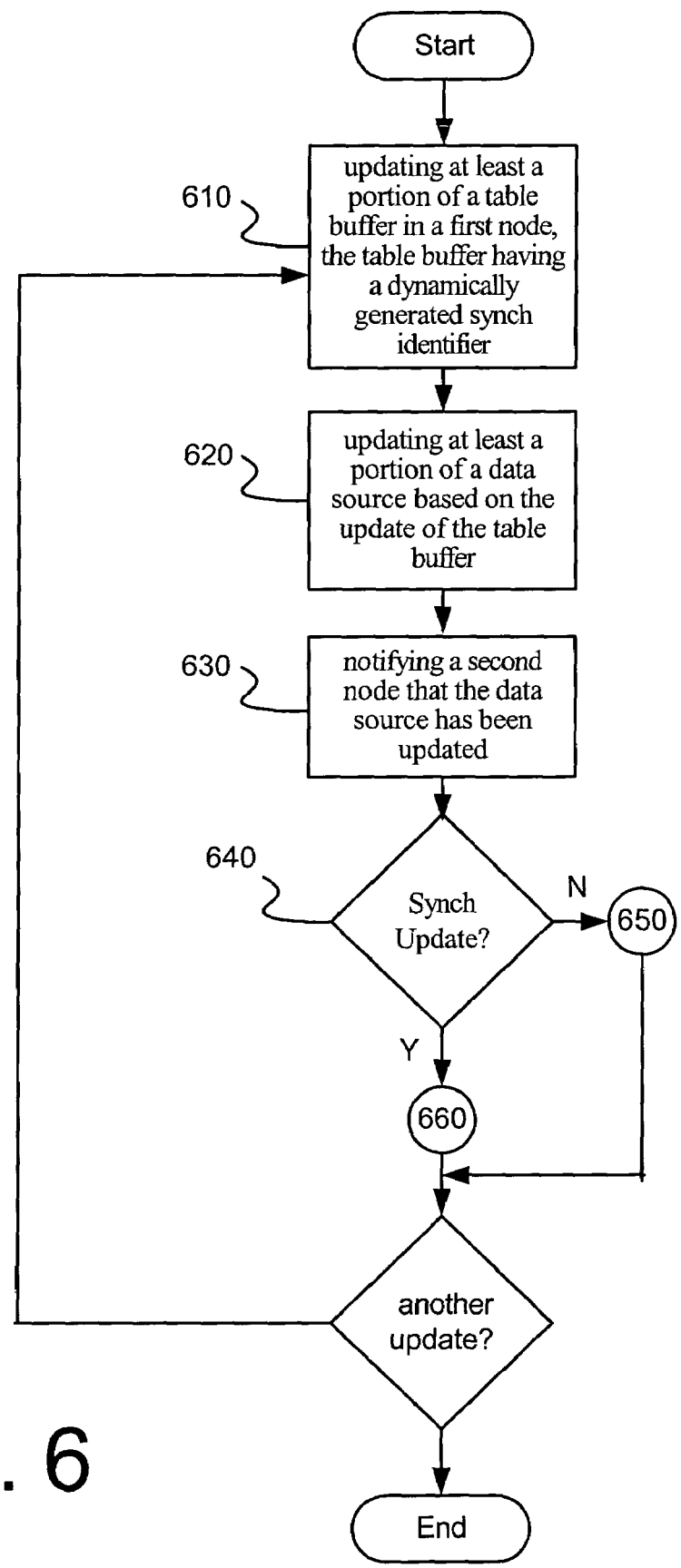
FIG. 6 is a flow diagram illustrating certain aspects of a method for updating distributed table buffers according to an embodiment of the invention.

FIG. 6 is a flow diagram illustrating certain aspects of a method for updating distributed table buffers according to an embodiment of the invention. Referring to process block 610, a portion of a table buffer in a first node is updated. The table buffer has a dynamically generated synch identifier in an embodiment of the invention. The updated table buffer in the first node caches data from an underlying data source. The underlying data source is updated based on the update to the table buffer in process block 620.

Referring to process block 630, a second node is notified that the data source has been updated. Notifying the second node that the data source has been updated may be performed in at least two methods: an asynchronous method and a synchronous method. The asynchronous method refers to providing notification via a global log of table buffer updates that persistent data has been updated. One or more distributed nodes may periodically poll the global log of table buffer updates to determine whether they are buffering persistent data that has been updated.

At process block 640 a decision may be made to employ an asynchronous and/or a synchronous update method. Reference numeral 650 indicates an asynchronous method has been selected and reference numeral 660 indicates that a synchronous update method has been selected. Asynchronous updates are more fully described with reference to FIG. 7 and synchronous updates are more fully described with reference to FIG. 8. In an embodiment, a combination of asynchronous and synchronous update methods may be used.

Figures 7, 8:
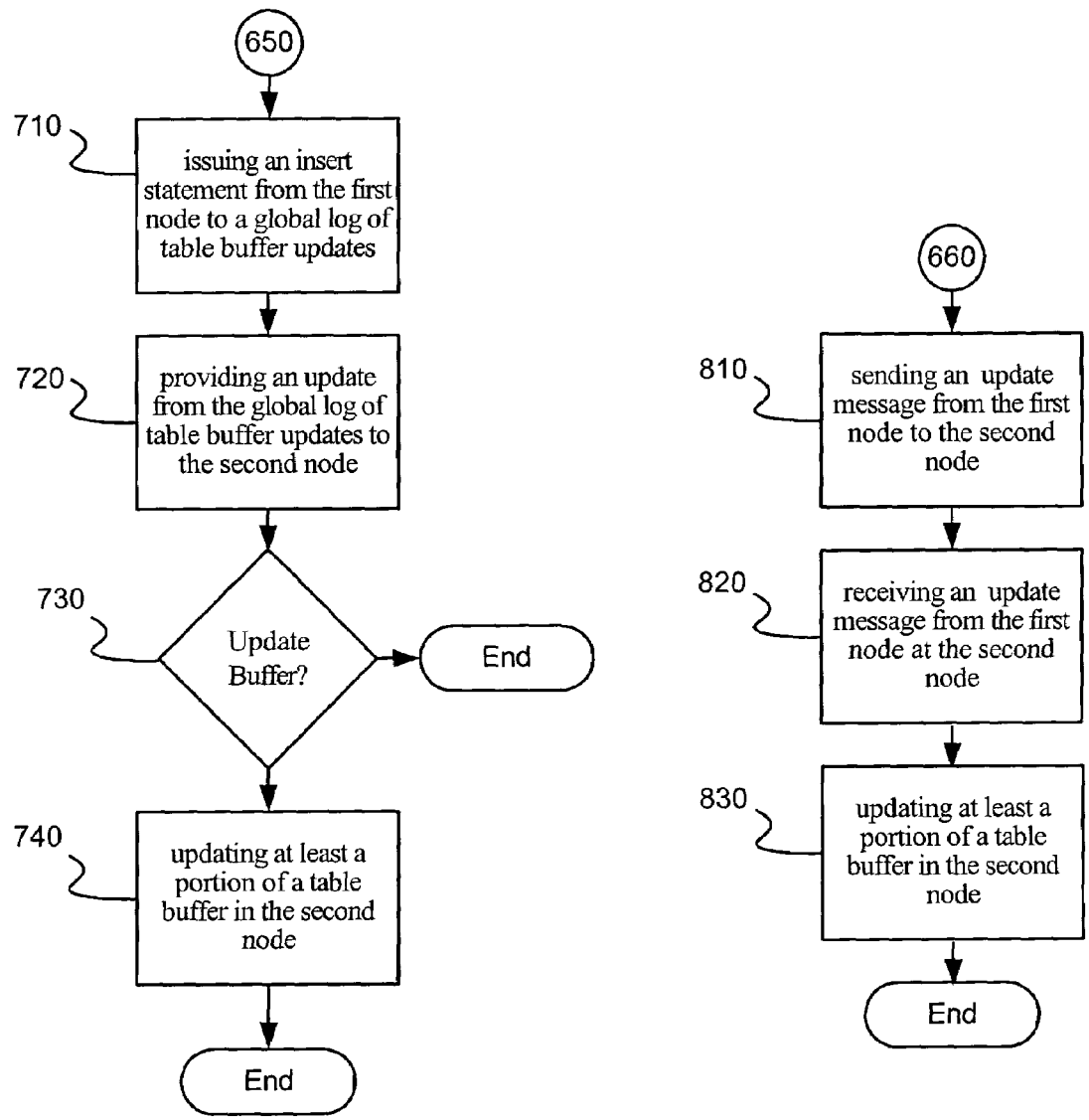
FIG. 7 is a flow diagram illustrating certain aspects of a method for asynchronously updating table buffers according to an embodiment of the invention.
FIG. 8 is a flow diagram illustrating certain aspects of a method for synchronously updating table buffers according to an embodiment of the invention.

FIG. 7 is a flow diagram illustrating certain aspects of a method for asynchronously updating table buffers according to an embodiment of the invention. Referring to process block 710, a first node sends an insert statement to a global log of table buffer updates to notify it that a table buffer in the first node has been updated. In an embodiment, the first node sends a JDBC compliant "INSERT INTO SYNCLOG" statement to the global log of table buffer updates. The first node may also update data in a data source at substantially the same time that it sends the insert statement to the global log. In an embodiment, the first node resides in the application layer of a distributed system and the global log of table buffer updates resides in the database layer of the distributed system.

Referring to process block 720, a second node determines that persistent data has been updated from the global log of table buffer updates. For example, the second node may read the global log of table buffer updates. In an embodiment, the second node may read from the global log at least one of: a data source identifier, a timestamp to indicate when the data source was updated, and a description of updated data (or the updated data). The data source identifier may be used to specify which data source has been updated. The second node may use the timestamp to determine whether a data source has been updated since the last time the second node read the global log. In an embodiment, the second node uses the description of updated data to determine whether one of its table buffers is buffering data that has been updated. In one embodiment, a synch manager residing in the second node issues the following JDBC statement every n seconds to read the global log of table buffer updates: "SELECT FROM SYNCLOG WHERE TIMESTAMP>:last_timestamp ORDER BY TIMESTAMP." The use of data source identifiers, timestamps, and descriptions of updated data are more fully described below with reference to FIG. 9, FIG. 10, and FIG. 11, respectively.

Referring to process block 740, the second node updates at least a portion of a table buffer, in an embodiment of the invention. Updating a portion of a table buffer may include invalidating data within the table buffer. For example, if the second node reads that a specified key range of a data source has been updated, the second node may invalidate portions of table buffer corresponding the specified key range. In an alternative embodiment, updating at portion of the table buffer may include replacing buffered data with updated data from a corresponding data source.

FIG. 8 is a flow diagram illustrating certain aspects of a method for synchronously updating table buffers according to an embodiment of the invention. The synchronous method of updating table buffers may include direct message traffic between nodes (e.g., between application servers) in a distributed system. Referring to process block 810 the first node sends an update message to the second node. In an embodiment the update message complies with the Java Message Service Specification—Version 1.1 JMS Standard, published on Feb. 11, 2002. In alternative embodiments of the invention, the update message may be implemented according to any of a number of public standards and proprietary algorithms.

The second node receives the update message from the first node at reference numeral 820. In an embodiment, the received update message includes at least one of: a data source identifier, a timestamp to indicate when the data source was updated, and a description of updated data. The second node updates at least a portion of a table buffer at process block 830.

Figure 9:
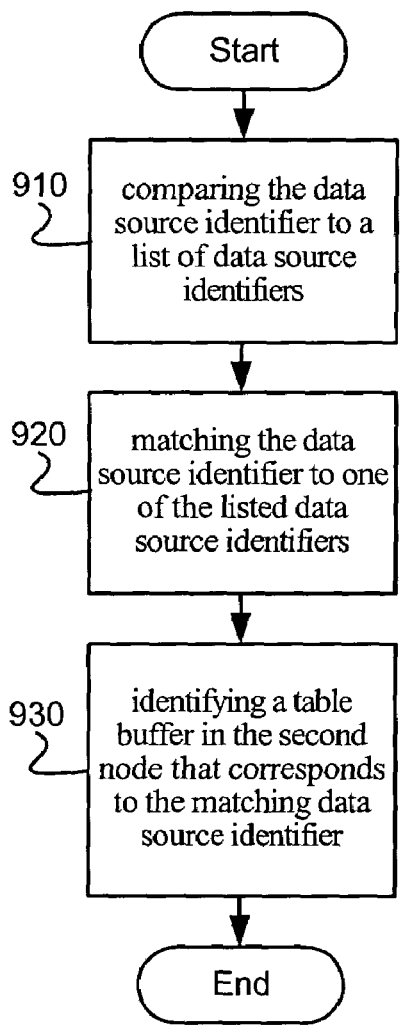
FIG. 9 is a flow diagram illustrating certain aspects of a method for determining whether a node is buffering data from a particular data source according to an embodiment of the invention.

FIG. 9 is a flow diagram illustrating certain aspects of a method for determining whether a node is buffering data from a particular data source. In an embodiment, a synch manager within a node maintains a list of data source identifiers that identify which data sources are buffered by one or more table buffers within the node. As discussed above with reference to FIGS. 7 and 8, a node may receive an update message that contains a data source identifier to specify a recently updated data source (or may obtain a data source identifier by reading a synch log). Referring to process block 910, the receiving node may compare the received data source identifier to the list of data source identifiers maintained by its synch manager. The receiving node matches the received data source identifier to a listed data source identifier at process block 920. If the received data source identifier matches a listed data source identifier, the receiving node identifies a table buffer corresponding to the matching data source identifier at process block 930. A portion of the table buffer may be updated or additional criteria may be considered before updating the table buffer in an embodiment of the invention. Alternatively, a portion of the table buffer may be invalidated and the updated data may be read into the table buffer when a user subsequently requests the data.

Figure 10:
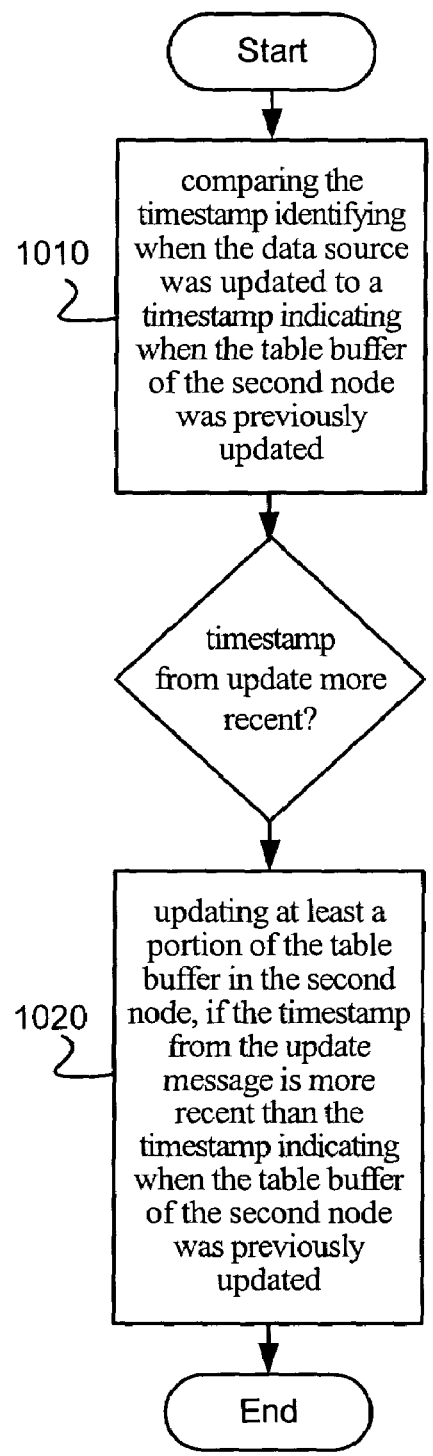
FIG. 10 is a flow diagram illustrating certain aspects of a method for using a timestamp to determine whether to update a table buffer.

FIG. 10 is a flow diagram illustrating certain aspects of a method for using a timestamp to determine whether to update a table buffer. A node may receive an update message that includes a timestamp indicating when a data source was updated (or may read a description of updated data from a synch log). The timestamp may be provided by a single source in an embodiment of the invention. For example, a timer service within the database layer may provide the timestamp. Synch managers within each node (e.g., within each application server) may maintain timestamps that indicate when one or more table buffers within the node have been updated (or were last updated). Referring to process block 1010, a received timestamp is compared to a timestamp indicating when a table buffer was last updated to determine which is more recent. If the received timestamp is more recent, then the buffered data source has been updated more recently than the table buffer. Referring to process block 1020, the table buffer is updated responsive to the received update message containing the recently issued timestamp.

Figure 11:
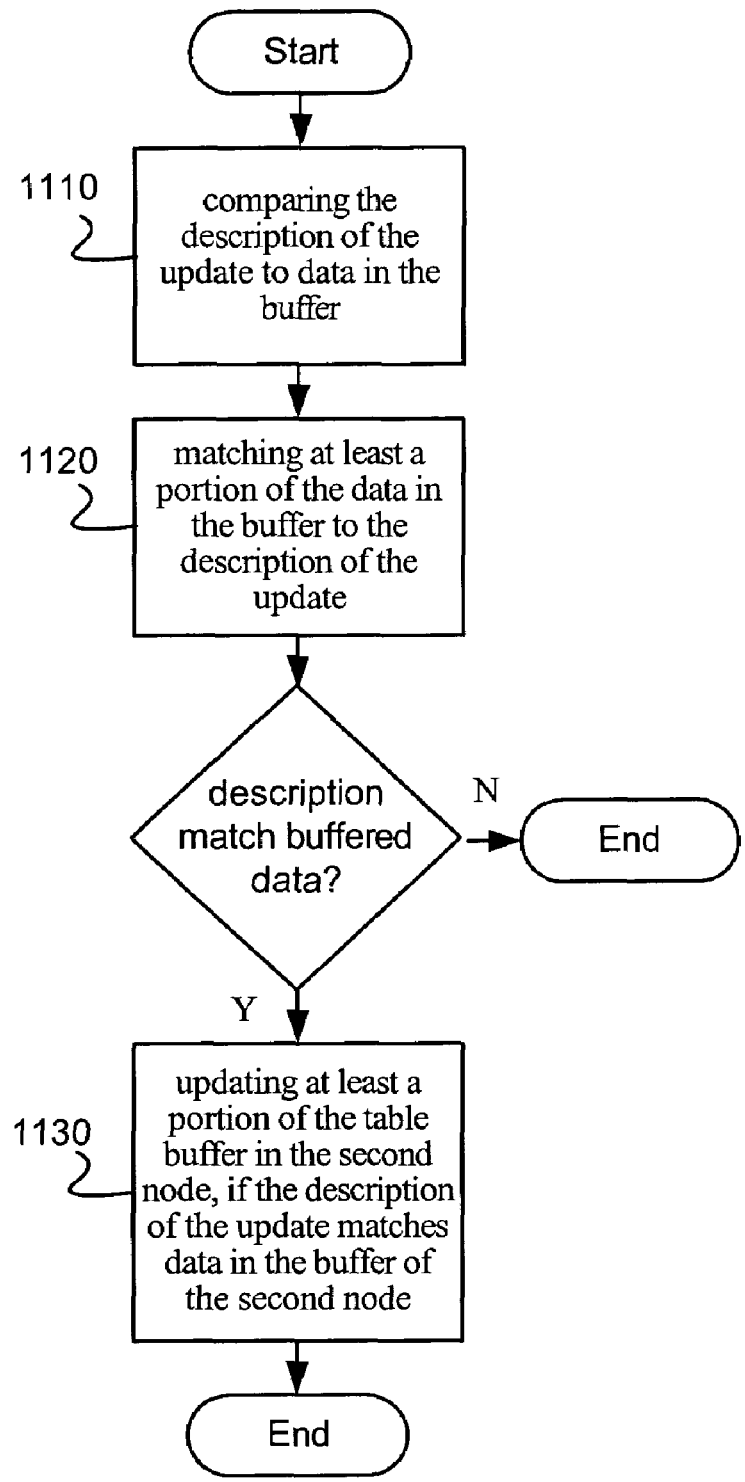
FIG. 11 is a flow diagram illustrating certain aspects of a method for determining whether a node is buffering data that has been updated.

FIG. 11 is a flow diagram illustrating certain aspects of a method for determining whether a node is buffering data that has been updated. A node may receive an update message that includes a description of updated data (or may read a description of updated data from a synch log). For example, the node may receive an update message that specifies a key range for a portion of a data source that has been updated. The receiving node compares the received description of updated data to data stored within one or more table buffers at process block 1110. The node determines whether the received description matches data that is stored in one or more table buffers at process block 1120. The matching data is updated at process block 1140. In an embodiment, updating data refers to invaliding data within a table buffer. In alternative embodiments of the invention, updating data includes replacing a portion of the data in the table buffer with corresponding (but more recent) data from the buffered data source.

The methods to be performed by a synch manager may constitute state machines or computer programs made up of computer-executable instructions. Describing the methods by reference to a flowchart enables one of ordinary skill in the art to develop such programs including such instructions to carry out the methods on suitably configured computing devices (e.g., one or more processors of a node) executing the instructions from computer-accessible media. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

Figure 12:
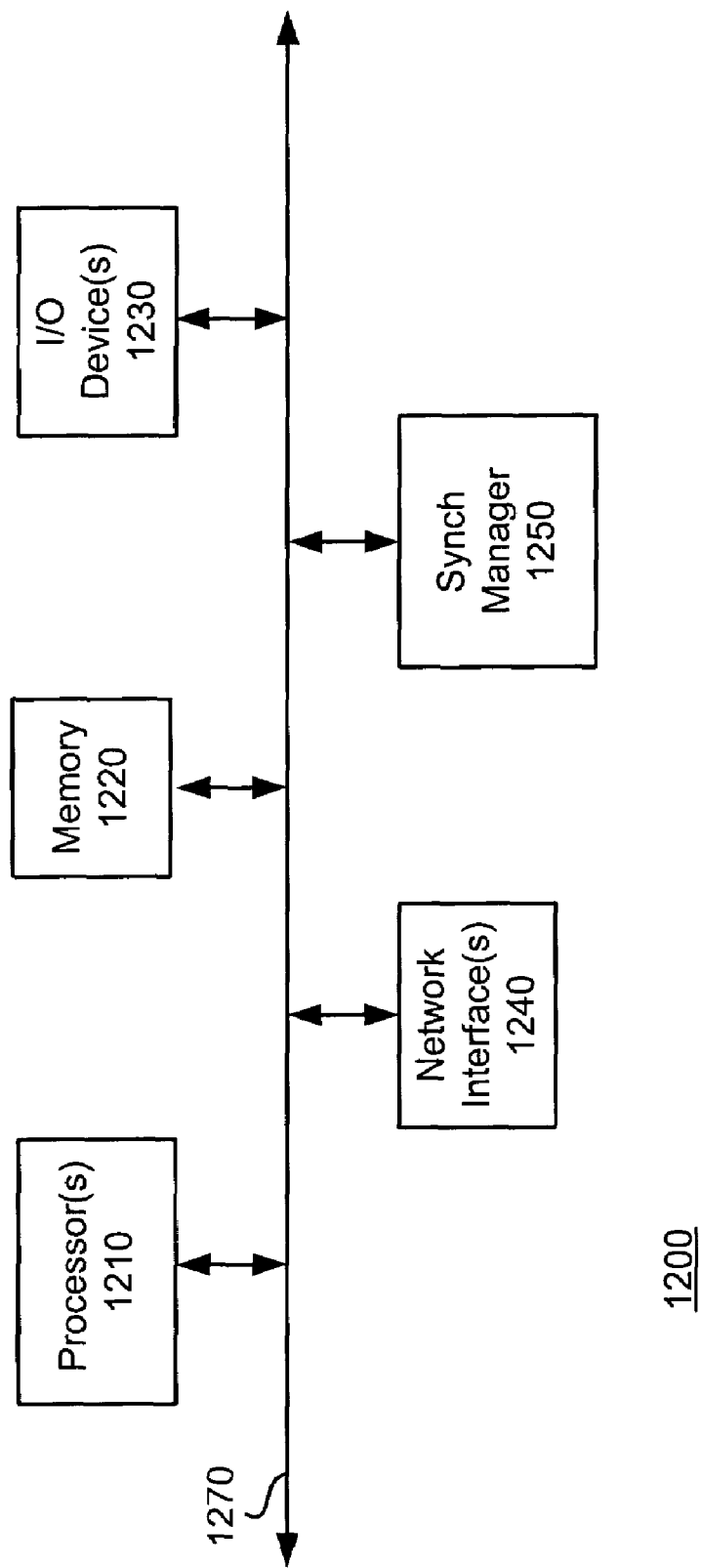
FIG. 12 is a block diagram of node 1200 implemented according to an embodiment of the invention.

FIG. 12 is a block diagram of node 1200 implemented according to an embodiment of the invention. Node 1200 may include: one or more processors 1210, memory 1220, one or more Input/Output devices 1230, network interface(s) 1240, and synch manager 1250. The illustrated elements may be connected together through system interconnect 1270. One or more processors 1210 may include a microprocessor, microcontroller, field programmable gate array (FPGA), application specific integrated circuit (ASIC), central processing unit (CPU), programmable logic device (PLD), and similar devices that access instructions from system storage (e.g., memory 1220), decode them, and execute those instructions by performing arithmetic and logical operations.

Synch manager 1250 enables node 1200 to administer one or more table buffers. Synch manager 1250 may be executable content, control logic (e.g., ASIC, PLD, FPGA, etc.), firmware, or some combination thereof, in an embodiment of the invention. In embodiments of the invention in which synch manager 1250 is executable content, it may be stored in memory 1220 and executed by processor(s) 1210.

Memory 1220 may encompass a wide variety of memory devices including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. Memory 1220 may also include one or more hard disks, floppy disks, ZIP disks, compact disks (e.g., CD-ROM), digital versatile/video disks (DVD), magnetic random access memory (MRAM) devices, and other system-readable media that store instructions and/or data. Memory 1220 may store program modules such as routines, programs, objects, images, data structures, program data, and other program modules that perform particular tasks or implement particular abstract data types that facilitate system use.

One or more I/O interfaces 1230 may include a hard disk drive interface, a magnetic disk drive interface, an optical drive interface, a parallel port, serial controller or super I/O controller, serial port, universal serial bus (USB) port, a display device interface (e.g., video adapter), a network interface card (NIC), a sound card, modem, and the like. System interconnect 1270 permits communication between the various elements of node 1200. System interconnect 1270 may include a wide variety of signal lines including one or more of a memory bus, peripheral bus, local bus, host bus, bridge, optical, electrical, acoustical, and other propagated signal lines.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method in a synchronization manager operating on a Web application server comprising:
   creating a table buffer to cache a portion of persistent data stored at a database communicably interfaced with the Web application server;
   writing an update to the portion of persistent data cached at the table buffer responsive to an update request received at the Web application server;
   sending an update message to the database describing the update and requesting the database to modify the persistent data stored at the database, in accordance with the update message; and
   sending a second update message to a second synchronization manager operating at a remote application server having a second table buffer therein, the second table buffer caching a corresponding portion of the persistent data stored at the database as the portion cached by the first table buffer, wherein the second update message describes the update and requests the second synchronization manager to update the corresponding portion of the persistent data cached at the second table buffer in accordance with the second update message;
   wherein the synchronization manager comprises:
   a synch identifier for each of a plurality of table buffers registered with the synchronization manager, wherein the synchronization manager to coordinate updates among the plurality of register table buffers; and
   a data source identifier for each of the plurality of table buffers registered with the synchronization manager, wherein each data source identifier indicates a data source at least partially cached by a corresponding table buffer.

2. The method of claim 1, further comprising:
   registering the table buffer with the synchronization manager, wherein the synchronization manager coordinates updates to the table buffer among a plurality of table buffers registered with the synchronization manager.

3. The method of claim 2, further comprising:
   registering the second table buffer of the remote application server with the synchronization manager of the Web application server, wherein the synchronization manager to coordinate updates to the table buffer with the second table buffer through the second synchronization manager of the remote application server.

4. The method of claim 3, wherein the remote application server comprises a second Web application server.

5. The method of claim 4, wherein the first Web application server and the second Web application server are each compatible with a Java 2 Enterprise Edition (J2EE) Standard.

6. The method of claim 1, further comprising:
   creating a new table buffer in the Web application server to cache data from a second database; and
   creating a new synch identifier to identify the new table buffer among a plurality of table buffers in the Web application server.

7. The method of claim 1, further comprising:
   determining that an update has been implemented in the second table buffer at the remote application server; and
   updating the table buffer of the Web application server in accordance with the update implemented in the second table buffer.

8. The method of claim 7, wherein determining that the update has been implemented comprises one of:
   receiving an update message from the remote application server describing the update implemented in the second table buffer and requesting the synchronization manager of the Web application server to update the first table buffer in accordance with the update;

reading a global log of table buffer updates comprising one or more update messages describing the update implemented in the second table buffer; and comparing a first timestamp indicating when the database was updated with a second timestamp indicating when the second table buffer of the remote application server was last updated.

9. The method of claim 8, wherein the global log of table buffer updates is stored at one or more of: the Web application server, the remote application server, and the database.

10. The method of claim 7, wherein updating the table buffer of the Web application server comprises:

invalidating at least a portion of the persistent data cached in the table buffer; and implementing the update in the table buffer based on an update message from the second synchronization manager describing the update implemented in the second table buffer at the remote application server.

11. The method of claim 1, wherein the table buffer of the Web application server is dynamically created responsive to the synchronization manager initializing a connection with the database.

12. A Web application server comprising computer-readable storage medium having instructions stored thereon that, when executed by the Web application server, cause a synchronization manager of the Web application server to perform operations comprising:

creating a table buffer to cache a portion of persistent data stored at a database communicably interfaced with the Web application server;

writing an update to the portion of persistent data cached at the table buffer responsive to an update request received at the Web application server;

sending an update message to the database describing the update and requesting the database to modify the persistent data stored at the database, in accordance with the update message; and sending a second update message to a second synchronization manager operating at a remote application server having a second table buffer therein, the second table buffer caching a corresponding portion of the persistent data stored at the database as the portion cached by the first table buffer, wherein the second update message describes the update and requests the second synchronization manager to update the corresponding portion of the persistent data cached at the second table buffer in accordance with the second update message;

wherein the synchronization manager comprises:

a synch identifier for each of a plurality of table buffers registered with the synchronization manager, wherein the synchronization manager to coordinate updates among the plurality of register table buffers; and a data source identifier for each of the plurality of table buffers registered with the synchronization manager, wherein each data source identifier indicates a data source at least partially cached by a corresponding table buffer.

13. The Web application server of claim 12, wherein the operations further comprising:

registering the table buffer with the synchronization manager, wherein the synchronization manager coordinates updates to the table buffer among a plurality of table buffers registered with the synchronization manager.

14. The Web application server of claim 13, wherein the operations further comprising:

registering the second table buffer of the remote application server with the synchronization manager of the Web application server, wherein the synchronization manager to coordinate updates to the table buffer with the second table buffer through the second synchronization manager of the remote application server.

15. The Web application server of claim 14, wherein the remote application server comprises a second Web application server.

16. The Web application server of claim 15, wherein the first Web application server and the second Web application server are each compatible with a Java 2 Enterprise Edition (J2EE) Standard.

17. The Web application server of claim 12, wherein the operations further comprising:

creating a new table buffer in the Web application server to cache data from a second database; and creating a new synch identifier to identify the new table buffer among a plurality of table buffers in the Web application server.

18. The Web application server of claim 12, wherein the operations further comprising:

determining that an update has been implemented in the second table buffer at the remote application server; and updating the table buffer of the Web application server in accordance with the update implemented in the second table buffer.

19. The Web application server of claim 18, wherein determining that the update has been implemented comprises one of:

receiving an update message from the remote application server describing the update implemented in the second table buffer and requesting the synchronization manager of the Web application server to update the first table buffer in accordance with the update;

reading a global log of table buffer updates comprising one or more update messages describing the update implemented in the second table buffer; and comparing a first timestamp indicating when the database was updated with a second timestamp indicating when the second table buffer of the remote application server was last updated.

20. The Web application server of claim 19, wherein the global log of table buffer updates is stored at one or more of: the Web application server, the remote application server, and the database.

21. The Web application server of claim 18, wherein updating the table buffer of the Web application server comprises:

invalidating at least a portion of the persistent data cached in the table buffer; and implementing the update in the table buffer based on an update message from the second synchronization manager describing the update implemented in the second table buffer at the remote application server.

22. The Web application server of claim 12, wherein the table buffer of the Web application server is dynamically created responsive to the synchronization manager initializing a connection with the database.

23. A synchronization manager stored in memory and executed by one or more processors in a Web application server, comprising:

means for creating a table buffer to cache a portion of persistent data stored at a database communicably interfaced with the Web application server;

means for writing an update to the portion of persistent data cached at the table buffer responsive to an update request received at the Web application server;

means for sending an update message to the database describing the update and requesting the database to modify the persistent data stored at the database, in accordance with the update message; and means for sending a second update message to a second synchronization manager operating at a remote application server having a second table buffer therein, the second table buffer caching a corresponding portion of the persistent data stored at the database as the portion cached by the first table buffer, wherein the second update message describes the update and requests the second synchronization manager to update the corresponding portion of the persistent data cached at the second table buffer in accordance with the second update message;

wherein the synchronization manager further comprises;

a synch identifier for each of a plurality of table buffers registered with the synchronization manager, wherein the synchronization manager to coordinate updates among the plurality of register table buffers; and a data source identifier for each of the plurality of table buffers registered with the synchronization manager, wherein each data source identifier indicates a data source at least partially cached by a corresponding table buffer.

24. The synchronization manager of claim 23, further comprising:

means for registering the table buffer with the synchronization manager, wherein the synchronization manager coordinates updates to the table buffer among a plurality of table buffers registered with the synchronization manager.

25. The synchronization manager of claim 24, further comprising:

means for registering the second table buffer of the remote application server with the synchronization manager of the Web application server, wherein the synchronization manager to coordinate updates to the table buffer with the second table buffer through the second synchronization manager of the remote application server.

26. The synchronization manager of claim 25, wherein the remote application server comprises a second Web application server.

27. The synchronization manager of claim 26, wherein the first Web application server and the second Web application server are each compatible with a Java 2 Enterprise Edition (J2EE) Standard.

28. The synchronization manager of claim 23, further comprising:

means for creating a new table buffer in the Web application server to cache data from a second database; and means for creating a new synch identifier to identify the new table buffer among a plurality of table buffers in the Web application server.

29. The synchronization manager of claim 23, further comprising:

means for determining that an update has been implemented in the second table buffer at the remote application server; and means for updating the table buffer of the Web application server in accordance with the update implemented in the second table buffer.

30. The synchronization manager of claim 29, wherein determining that the update has been implemented comprises one of:

means for receiving an update message from the remote application server describing the update implemented in the second table buffer and requesting the synchronization manager of the Web application server to update the first table buffer in accordance with the update;

means for reading a global log of table buffer updates comprising one or more update messages describing the update implemented in the second table buffer; and means for comparing a first timestamp indicating when the database was updated with a second timestamp indicating when the second table buffer of the remote application server was last updated.

31. The synchronization manager of claim 30, wherein the global log of table buffer updates is stored at one or more of: the Web application server, the remote application server, and the database.

32. The synchronization manager of claim 29, wherein updating the table buffer of the Web application server comprises:

means for invalidating at least a portion of the persistent data cached in the table buffer; and means for implementing the update in the table buffer based on an update message from the second synchronization manager describing the update implemented in the second table buffer at the remote application server.

33. The synchronization manager of claim 23, wherein the table buffer of the Web application server is dynamically created responsive to the synchronization manager initializing a connection with the database.

* * * * *